Nov. 3, 1953     P. H. LA BURTHE     2,658,093
MANUFACTURE OF GLASS
Filed Aug. 15, 1949

INVENTOR.
PIERRE HENRI LABURTHE
BY
Dale A. Bauer
ATTORNEY

Patented Nov. 3, 1953

2,658,093

UNITED STATES PATENT OFFICE 2,658,093

MANUFACTURE OF GLASS

Pierre Henri La Burthe, Paris, France, assignor to Societe Anonyme des Manufactures des Glaces et Produits Chimiques de Saint-Gobain, Chauny & Cirey, Paris, France Application August 15, 1949, Serial No. 110,276
Claims priority, application France
August 17, 1948

7 Claims. (Cl. 13—6)

This invention relates to the manufacture of glass and to glass furnaces.

In glass furnaces there are convection currents which arise from differences in temperature between certain zones of the furnace. These differences in temperature are frequently produced by vertical walls which are cooler than the bath and cool the glass which is in contact with them. This cooler glass, having become more dense, descends alongside the wall and is replaced by hotter glass coming from another location in the furnace. This sets up convection currents in the furnace, the cooled glass descending alongside the cooler body, such as a wall, traveling across the bottom of the furnace, which is also cooler than the glass and forcing hot glass to rise to the center of the furnace and spread out toward the walls where it is also cooled, sinks, and completes the cycle. There are thus established transverse convection currents that involve huge masses of glass. These currents may present some advantages in certain parts of the furnace but are highly undesirable in other parts, in particular, in settling and working zones, where it is desirable that the glass, which is to be withdrawn, should be at the most even temperature possible and in an homogeneous condition.

In continuous furnaces the working which occurs in the glass mass by reason of these transverse convection currents, combines with the longitudinal currents arising from the movement of the glass from end to end and constitute a pool of glass of which the temperature is not uniform. This is the cause of material difficulties in the making of glass articles. At the point of withdrawal this imperfection is the greater as the withdrawal is greater or takes place over larger areas of the furnace, as is notably the case in the mechanical making of drawn window glass or of a rolled glass.

The object of this invention is to prevent the establishment of such currents in the glass.

Another object is a process to control or to eliminate such currents.

Another object is to construct furnaces having means for the control and elimination of such currents.

The objects of the invention are accomplished generally speaking by locating in the glass bath, in the vicinity of the lateral walls of at least one zone of the tank, heating means which at each level of the considered zone tend to equalize the temperature of the bath over its whole width and thus to establish a quieter bath, and one substantially free of such currents. It is to be understood that the use of such auxiliary heating means should be restricted to portions of the bath where such convection currents are not desired, leaving other portions of the bath, where they may be useful, without control. In the case of furnaces having upright walls which tend to cool the glass, heating means may be arranged near the walls to maintain the temperature of the glass in the vicinity of the walls at the same temperaure as the rest of the bath, thus eliminating convection currents.

The heating means employed may be of any sort which can be introduced beneath the surface of the bath, but a preferred form of the invention involves the use of Joule effect between electrodes arranged along the side of the cold wall in the path of the descending currents of the glass. These electrodes are very close to the walls and substantially parallel to it. The electrodes are at a small distance from each other and are fed by a system capable of imposing a current of regulable intensity upon them. In particular, the system may have a regulable voltage.

In a modification of the invention the live electrodes, by means of which the electrical current is brought into the bath to produce Joule effect, are more widely spaced but the current that passes between them is constrained to follow a path established by conductive bodies, that is to say by idler electrodes, which are not connected to a source of electric current but which have a higher conductivity than glass and concentrate the lines of current which traverse the glass and thus reduce the tendency of the current to flow at a too great distance from the walls. These idler electrodes, and also the live electrodes, may be constructed of the usual heat resistant conductors, such as graphite and metal, with the usual attention to the particular composition or temperature of the bath. These idler electrodes, and the live electrodes, may be in any desired shape, such as plates or of rods, for instance.

A broadly advantageous arrangement in the situation where rod electrodes are used, consists in introducing them vertically into the bath, a few centimeters from the wals, through the bottom of the furnace, their length extending upward almost to the glass level. It is preferred that the distance between two consecutive electrodes shall not be greater than four times the thickness or diameter of the electrode. Thus, for example, the distance between two electrodes of 30 mm. diameter should preferably not be more than 120 mm.

It may be advantageous, in order to compensate for variation in the conductivity of the glass between the depths and the surface of the bath to give to the electrodes the form of a truncated cone, the small end of which is near the surface. It is also possible to arrange the electrodes like a fan to accomplish a similar result.

Figure 3:
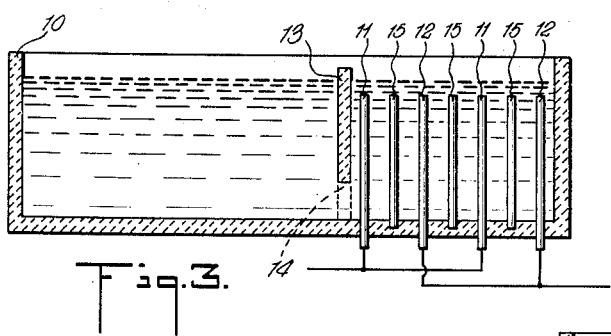
Fig. 3 is a section on the line 3—3 of Fig. 2 looking in the direction of the arrows.

The electrodes according to the invention are parallel to the longitudinal walls and penetrate the bottom of the furnace as indicated in Fig. 3. Three electrodes 11 are shown attached to one side of the current source, and three electrodes 12 are shown attached to the other side. The electrodes are close together and the current is restricted to a narrow zone.

Figure 1:
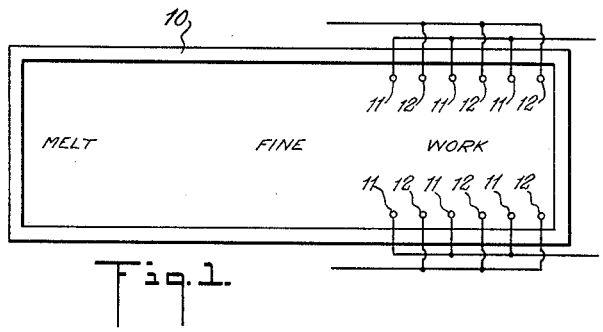
Fig. 1 is a diagrammatic, plan view of a glass furnace tank of simple design having the electrodes arranged near the working zone only.
Figure 6:
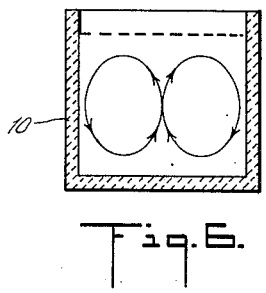
Fig. 6 is a diagrammatic end view of a furnace showing convection currents set up in the manner hereinbefore described.

In Fig. 1, the numeral 10 refers to a glass furnace of rectangular shape having at one end a melting zone, in the middle a fining zone, and at the other end a working zone. Glass raw materials are admitted to the tank at the melting end, the melted glass is fined in the central part of the tank, and the finished glass is withdrawn at the working end. The concentric circles 29 above Fig. 3 and the diagrammatic showings 20 in Fig. 2 indicate oil burners of the type employed in the manufacture of glass. At the opposite sides of the working zone are Joule effect electrodes 11—12 constructed and arranged to oppose the convection currents diagrammatically indicated in Fig. 6.

Figure 2:
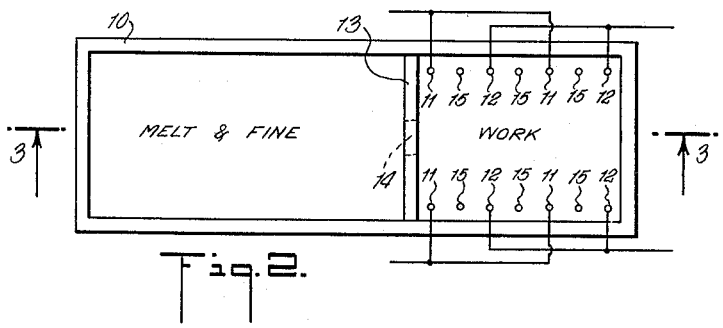
Fig. 2 is a plan view of a furnace in which the working zone is separated from the melting and fining zones by a barrier.

In Fig. 2, a similar tank 10 is provided with a barrier 13 which separates the working from other zones, the barrier being penetrated at the bottom by a small orifice 14. Any tendency of the hot glass from the fining zone, or for the cold glass from the walls to set up convection currents in the working zone is neutralized by the electrodes along the walls.

In Fig. 3, the electrodes 11, 12 which supply current to the bath, are separated by electrode 15 of the idler type, which has higher conductivity than the bath and serves to constrain the Joule effect currents to a narrow lane parallel to the wall.

Figure 4:
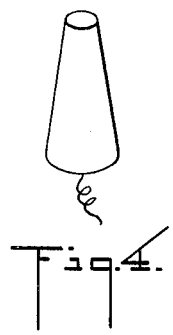
Fig. 4 is a diagrammatic perspective view of a conic electrode.

In Fig. 4 there is shown an electrode having the form of a truncated cone, a form that compensates for the difference in conductivity of the glass between the bottom and the top of the glass bath and insures the delivery of adequate current to the cooler glass at the bottom.

Figure 5:
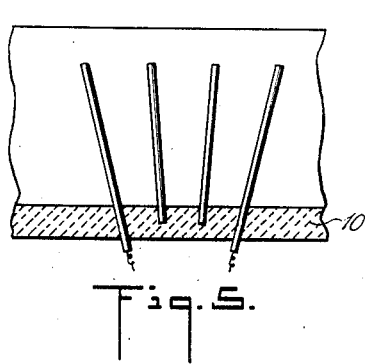
Fig. 5 is a diagrammatic sectional view of a furnace having a fanned electrode arrangement.

In Fig. 5 a similar result is obtained by fanning cylindrical electrodes out at their tops and thus interposing more glass at the top than at the bottom and compensating for temperature and resistivity. The energy to be expended between cooperating electrodes depends upon the losses by radiation and convection, losses which are a function of the construction of the walls and of the difference in temperature between the glass and the surrounding medium. I have shown that, with the refractory materials usually employed and at the usual temperatures used in glass furnaces, the energy to be used may vary from 2 to 15 kilowatts per square meter of vertical wall surface. The voltage employed depends on the composition of the glass and on its temperature, as glass varies in conductivity according to its composition and its temperature. By employing two electrodes parallel to the wall and to each other at a distance of 15 centimeters in an ordinary soda calcium glass, I have, in one reduction to practice, employed 9 to 12 volts between the said electrodes, depending on the temperature of the glass, and 2–15 kilowatts per square meter of vertical wall surface.

By regulating the quantity of energy expended in the glass through the electrodes adjacent the walls, it is possible to compensate at will, altogether or in part, for the heat lost through the furnace wall. The facility with which electrical energy can be used to vary the input of heat to any selected part of the furnace enables the operator to prevent the formation of undesirable convection currents and to stop those which may have formed, reducing the bath to a desirable condition of quiescence.

In thus nullifying the cooling action of the vertical walls, the cooling of the glass only occurs, practically speaking, at the surface of the bath and through the bottom. Consequently, there is established in the working zone of the furnace, or in any selected part, a regular temperature gradient from the free surface to the bottom, the isothermal lines extending practically horizontal. It is therefore possible to withdraw the glass at a uniform temperature through the orifice of withdrawal, or from the working zone, and this results in an improvement in all the glassware produced from the furnace.

There are several parts to the present invention, including an improvement in the process of manufacturing glass and an improvement in glass furnaces. The process involves establishing in the glass, near objects which present a temperature differential, such as walls, an input of heat which is of sufficient intensity to equalize the temperature throughout the whole furnace and to prevent the formation of convection currents. The invention also includes a furnace in which electrodes are employed for causing an electric current to pass through the glass bath, said electrodes preferably extending through the sole of the furnace and being located in proximity to the walls or other cooling body. It includes the use of idler electrodes between charged electrodes, and electrodes of construction which compensates for the different resistivity of various levels of the bath arising from a temperature gradient.

As many apparently widely different embodiments of the present invention may be made without departing from the spirit and scope thereof, it is to be understood that the invention is not limited to the specific embodiments, except as defined in the appended claims.

What is claimed is:

1. A glass furnace having a channel with walls between which glass flows during its manufacture, said furnace having a barrier separating the working zone from the preceding zone of the furnace, said barrier having a small connecting conduit between said zones, and narrow electrodes in said working zone standing submerged in a line before said wall, alternate live electrodes in said line being of opposite polarity, and means to supply said electrodes with current of heating intensity.

2. A glass furnace having as an essential element a working zone bounded by at least one upright cold wall which tends to cool the glass contiguous thereto, several electrodes in said working zone standing submerged in and being restricted to a line before said wall in the glass that is cooled by said wall, said line being substantially coextensive with the cold wall of said zone, alternate live electrodes in said line being of opposite polarity, said electrodes being placed relatively close together so as to restrict the current passing between them to the vicinity of the said wall, and means to supply said electrodes with current of heating intensity sufficient to nullify the cooling effect of said wall.

3. A glass furnace having as an essential element a channel, along which glass flows, bounded by upright walls, at least one of said walls being cold and acting to cool the glass contiguous thereto, and a line of narrow upright electrodes submerged in the glass before said wall and located in the glass that is cooled by said wall, said line extending substantially the length of the said cold wall, alternate live electrodes in said line being of opposite polarity, and means to supply said live electrodes with current of heating intensity sufficient to nullify the cooling effect of said wall, the electrodes in said line being spaced by short distances that substantially restrict the electric current to the glass cooled by said wall.

4. A glass furnace having as an essential element a working compartment separated by a wall from a fining compartment, said working compartment having a wall which tends to cool the hot glass, several upright Joule effect rod electrodes projecting through the bottom of the working compartment restricted to a line parallel and close to said cold wall, said electrodes extending substantially the length of the wall and being spaced from one another by not over about four electrode diameters, and means connecting electrodes in said line to different poles of a same source of alternating current so as to form a vertical Joule effect curtain in the path of glass currents descending along said wall.

5. The furnace of claim 4 in which an idler rod electrode is interposed between electrodes of opposite polarity in said line.

6. A glass furnace having as an essential element a separate working tank with a wall which tends to cool the hot glass, means outside the working tank to melt and fine the glass mass, and heating means in the working tank to prevent downwardly directed convection currents along said wall comprising several vertically arranged rod electrodes in the immediate vicinity of and extending substantially the length of said cold wall, said electrodes being so connected to different polarities and at a distance from each other so small, circa 4 diameters, as to form a Joule effect curtain substantially parallel to and in the immediate vicinity of said wall, in the path of glass currents descending along said wall, the heating effect of said electrodes being of the degree required to bring the temperature of the glass at the cold wall to about equality with that remote from the wall.

7. A glass furnace having as an essential element a tank bounded by upright walls, at least a portion of said walls being cold and acting to cool the glass contiguous thereto to set up convection currents in the glass with flow down the said cold portion, and a line of electrodes submerged in the glass before said portion and located in the glass that is cooled by said portion, said line extending substantially the length of the said cold portion, alternate live electrodes in said line being of opposite polarity, restricting the electric current of said electrodes to a course parallel to the cold portion, and means to supply said live electrodes with current of heating intensity sufficient to nullify the cooling effect of said portion, the electrodes in said line being spaced from each other by short distances that substantially restrict the electric current to the glass cooled by said wall.

PIERRE HENRI LA BURTHE.

References Cited in the file of this patent

UNITED STATES PATENTS

| Number | Name | Date |
|---|---|---|
| 676,985 | Koller | June 25, 1901 |
| 974,008 | Wolff | Oct. 25, 1910 |
| 1,234,947 | Sperling | July 31, 1917 |
| 1,815,977 | Hitner | July 28, 1931 |
| 1,872,477 | Mambourg | Aug. 16, 1932 |
| 1,880,540 | Wadman | Oct. 4, 1932 |
| 1,933,527 | Wadman | Oct. 31, 1933 |
| 2,119,947 | Blau et al. | June 7, 1938 |
| 2,225,617 | Borel et al. | Dec. 24, 1940 |
| 2,267,537 | Romazzotti | Dec. 23, 1941 |
| 2,281,408 | Borel | Apr. 28, 1942 |
| 2,283,188 | Cornelius | May 19, 1942 |
| 2,350,734 | Dumarest | June 6, 1944 |
| 2,417,913 | Cornelius | Mar. 25, 1947 |
| 2,490,339 | De Voe | Dec. 6, 1949 |
| 2,523,030 | Labino | Sept. 19, 1950 |
| 2,559,683 | Skinner et al. | July 10, 1951 |

FOREIGN PATENTS

| Number | Country | Date |
|---|---|---|
| 28,276 | Great Britain | of 1908 |
| 82,577 | Sweden | Dec. 13, 1934 |
| 239,718 | Switzerland | Feb. 18, 1946 |